US010904734B2

(12) United States Patent
Lee et al.

(10) Patent No.: US 10,904,734 B2
(45) Date of Patent: Jan. 26, 2021

(54) METHOD AND APPARATUS FOR NOTIFYING SI UPDATE, EAB UPDATE AND PWS MESSAGE IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/745,381

(22) PCT Filed: Aug. 11, 2016

(86) PCT No.: PCT/KR2016/008821
§ 371 (c)(1),
(2) Date: Jan. 16, 2018

(87) PCT Pub. No.: WO2017/026806
PCT Pub. Date: Feb. 16, 2017

(65) Prior Publication Data
US 2019/0110179 A1    Apr. 11, 2019

Related U.S. Application Data

(60) Provisional application No. 62/204,440, filed on Aug. 13, 2015.

(51) Int. Cl.
*H04M 11/04*        (2006.01)
*H04W 4/90*         (2018.01)
(Continued)

(52) U.S. Cl.
CPC ............. *H04W 4/90* (2018.02); *H04W 48/02* (2013.01); *H04W 48/12* (2013.01); *H04W 68/005* (2013.01)

(58) Field of Classification Search
CPC ..... H04W 4/90; H04W 48/12; H04W 68/005; H04W 48/02
(Continued)

(56) References Cited

U.S. PATENT DOCUMENTS

2010/0272017 A1    10/2010  Terry et al.
2011/0002250 A1*   1/2011   Wang ................... H04W 76/40
                                                  370/311
(Continued)

FOREIGN PATENT DOCUMENTS

CN         101651506 A    2/2010
WO      2010/062534 A1    6/2010
(Continued)

OTHER PUBLICATIONS

Section 5.2.1, 3GPP TS 36.331 V12.6.0, "3rd Generation Partnership Project; Technical Specification Group Radio Access Network; Evolved Universal Terrestrial Radio Access (E-UTRA); Radio Resource Control (RRC); Protocol specification (Release 12)", Jun. 2015, pp. 28-30.

(Continued)

*Primary Examiner* — Huy C Ho
(74) *Attorney, Agent, or Firm* — Dentons US LLP (57) ABSTRACT

A method and apparatus for receiving system information (SI) in a wireless communication system is provided. A user equipment (UE), which may be in an enhanced coverage or operate with a narrower bandwidth than a cell bandwidth, receives an indication of at least one of SI update, earthquake and tsunami warning system (ETWS) notification, commercial mobile alert system (CMAS) or extended access barring (EAB) modification via a physical downlink control channel (PDCCH) from a network, and receives system information according to the received indication from the network.

12 Claims, 9 Drawing Sheets

(51) Int. Cl.
    *H04W 68/00*     (2009.01)
    *H04W 48/12*     (2009.01)
    *H04W 48/02*     (2009.01)

(58) Field of Classification Search
    USPC ..................................................... 455/404.1
    See application file for complete search history.

(56) References Cited

U.S. PATENT DOCUMENTS

| | | | |
|---|---|---|---|
| 2011/0086608 A1 | 4/2011 | Yamagishi et al. | |
| 2012/0281566 A1 | 11/2012 | Pelletier et al. | |
| 2014/0293908 A1 | 10/2014 | Kumar et al. | |
| 2015/0117396 A1* | 4/2015 | Wang | H04W 72/042 |
| | | | 370/330 |
| 2016/0100380 A1 | 4/2016 | Uha et al. | |
| 2017/0105166 A1* | 4/2017 | Lee | H04W 68/005 |

FOREIGN PATENT DOCUMENTS

| | | |
|---|---|---|
| WO | 2013/129374 A1 | 9/2013 |
| WO | 2013/183966 A1 | 12/2013 |
| WO | 2014/197501 A1 | 12/2014 |
| WO | 2015/041579 A1 | 3/2015 |
| WO | 2015/043779 A1 | 4/2015 |
| WO | 2015/066645 A1 | 5/2015 |
| WO | 2015/116732 A1 | 8/2015 |

OTHER PUBLICATIONS

Ericsson: "System information acquisition for low complexity and coverage enhanced UEs", R2-150454, XP050935713, 3GPP TSG RAN WG2 Meeting #89, Athens, Greece, Feb. 9-13, 2015.

* cited by examiner

METHOD AND APPARATUS FOR NOTIFYING SI UPDATE, EAB UPDATE AND PWS MESSAGE IN WIRELESS COMMUNICATION SYSTEM

CROSS-REFERENCE TO RELATED APPLICATIONS

This application is the National Stage filing under 35 U.S.C. 371 of International Application No. PCT/KR2016/008821, filed on Aug. 11, 2016, which claims the benefit of U.S. Provisional Application No. 62/204,440 filed on Aug. 13, 2015, the contents of which are all hereby incorporated by reference herein in their entirety.

BACKGROUND OF THE INVENTION

Field of the Invention

The present invention relates to wireless communications, and more particularly, to a method and apparatus for notifying system information (SI) update, extended access barring (EAB) update and/or public warning system (PWS) message in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Paging is the mechanism in which the network tells UE saying "I have something for you". Then the UE decode the content (paging cause) of the paging message and the UE has to initiate the appropriate procedure. The purpose of the paging procedure is to page UEs in RRC_IDLE, i.e. to transmit paging information to UEs in RRC_IDLE. Further, as described above, the purpose of the paging procedure is to inform UEs in RRC_IDLE and UEs in RRC_CONNECTED about a system information change and/or, to inform about an earthquake and tsunami warning system (ETWS) primary notification and/or ETWS secondary notification and/or, to inform about a commercial mobile alert system (CMAS) notification and/or, to inform UEs in RRC_IDLE about an extended access barring (EAB) parameters modification.

For a new type of UEs, e.g. MTC UE, a mechanism for informing about system information change, ETWS/CMAS notification or EAB parameters modification may be required to be enhanced.

SUMMARY OF THE INVENTION

The present invention provides a method and apparatus for notifying system information (SI) update, extended access barring (EAB) update and/or public warning system (PWS) message in a wireless communication system. The present invention provides a method and apparatus for receiving an indication of at least one of SI update, earthquake and tsunami warning system (ETWS) notification, commercial mobile alert system (CMAS) notification or EAB modification via a physical downlink control channel (PDCCH).

In an aspect, a method for receiving, by a user equipment (UE), system information (SI) in a wireless communication system is provided. The method includes receiving an indication of at least one of SI update, earthquake and tsunami warning system (ETWS) notification, commercial mobile alert system (CMAS) or extended access barring (EAB) modification via a physical downlink control channel (PDCCH) from a network, and receiving system information according to the received indication from the network.

The UE may be in an enhanced coverage. The UE may operate with a narrower bandwidth than a cell bandwidth. The PDCCH may be addressed by a paging radio network temporary identity (P-RNTI).

In another aspect, a user equipment (UE) in a wireless communication system is provided. The UE includes a memory, a transceiver, and a processor, coupled to the memory and the transceiver, that controls the transceiver to receive an indication of at least one of system information (SI) update, earthquake and tsunami warning system (ETWS) notification, commercial mobile alert system (CMAS) or extended access barring (EAB) modification via a physical downlink control channel (PDCCH) from a network, and controls the transceiver to receive system information according to the received indication from the network.

An indication of SI update, ETWS notification, CMAS notification or EAB modification can be notified efficiently to a user equipment (UE), specifically in an enhanced coverage or operating with a narrower bandwidth.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
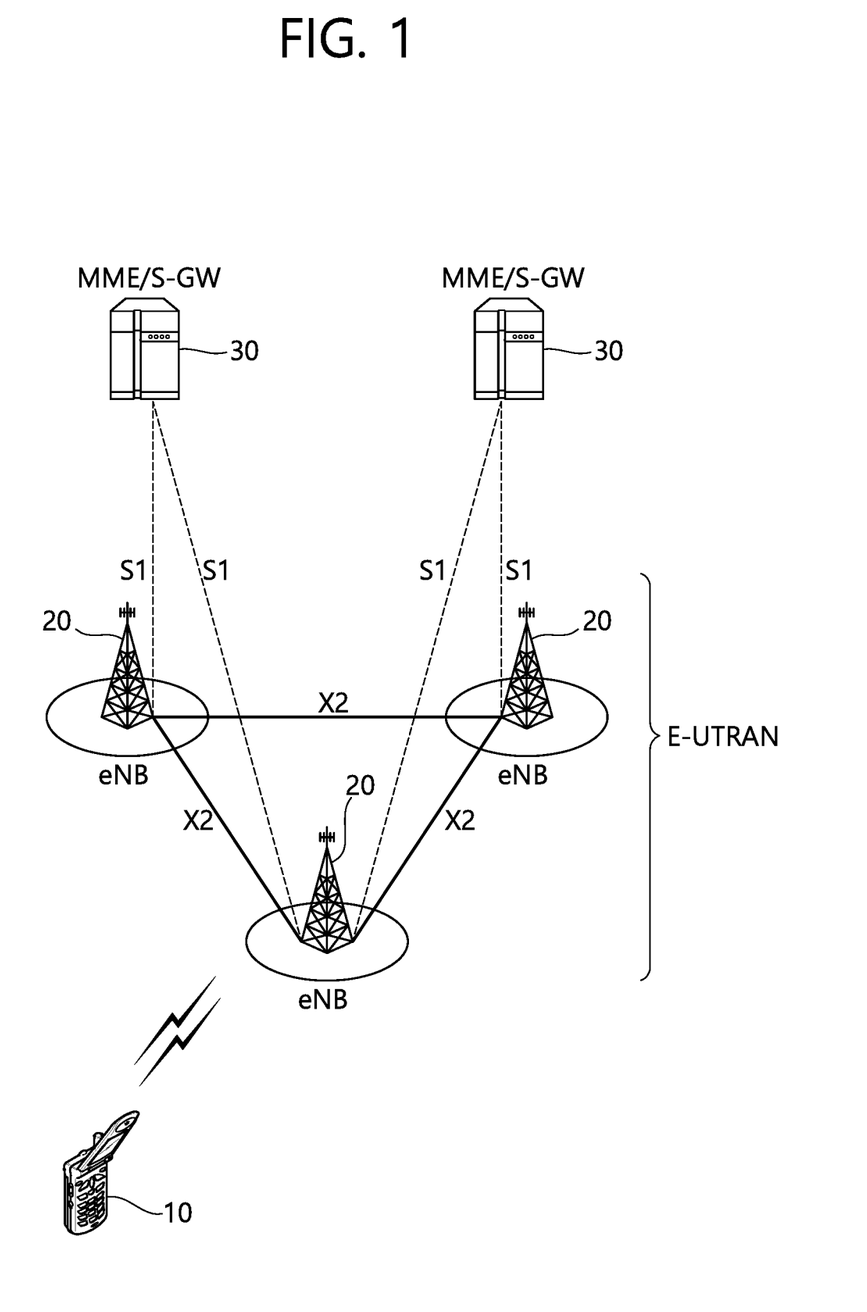
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
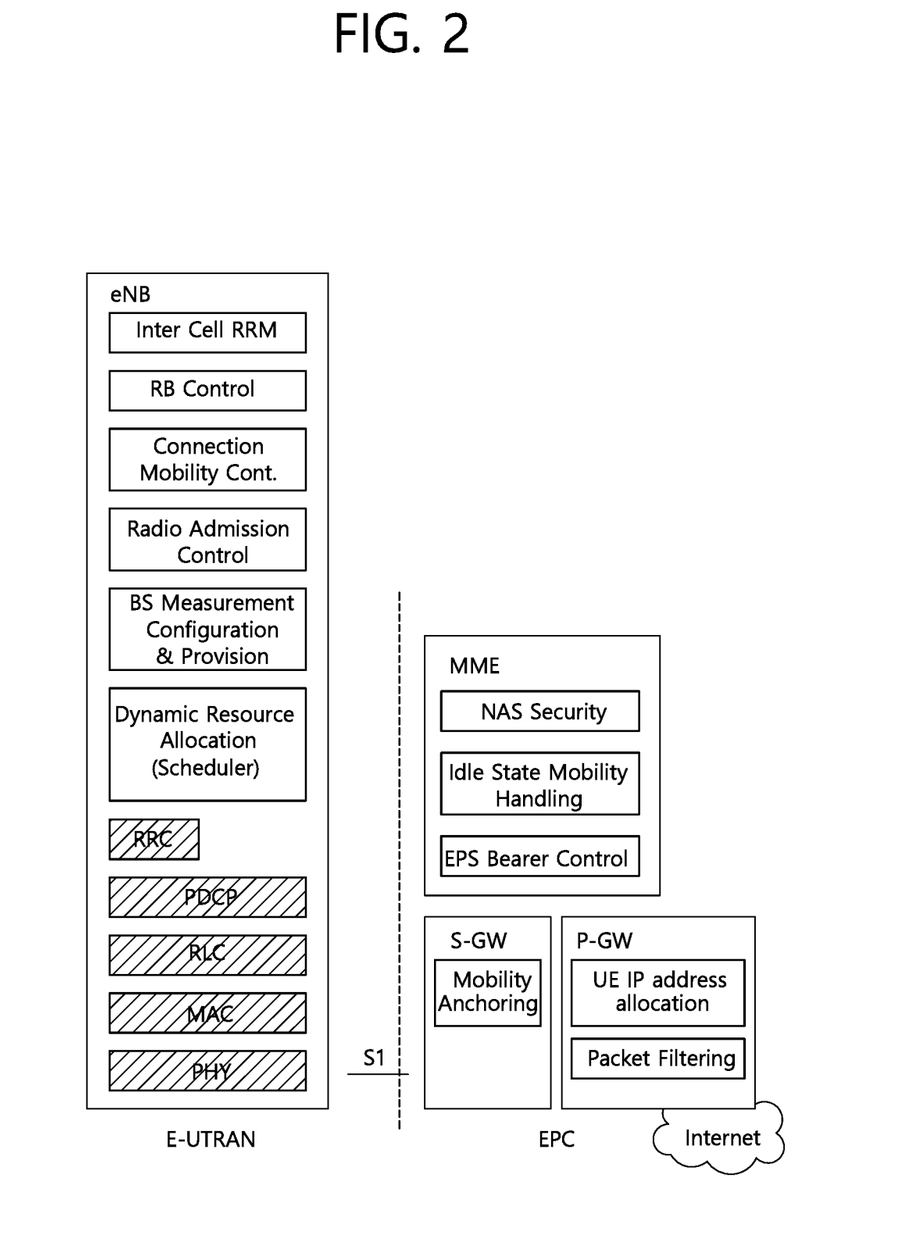
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
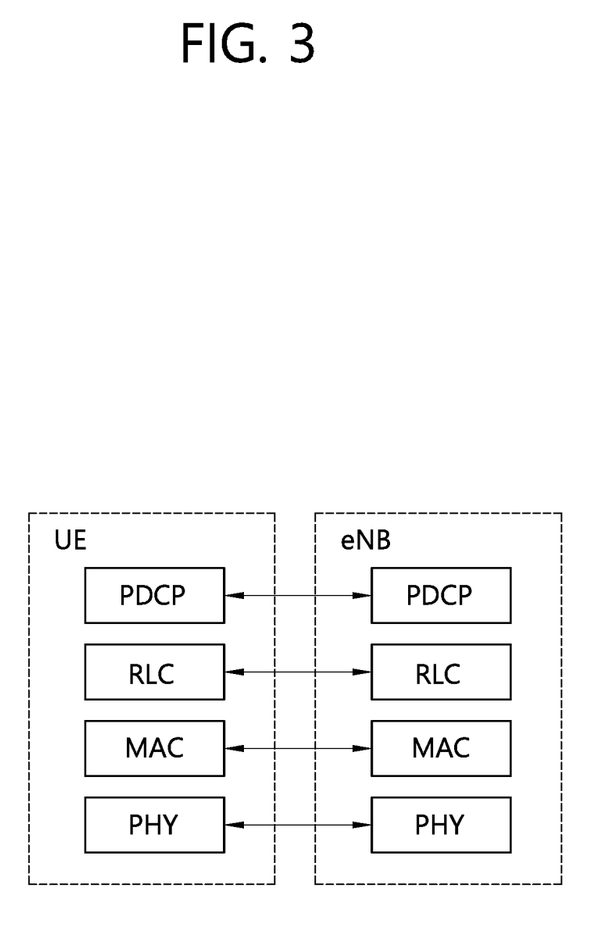
FIG. 3 shows a block diagram of a user plane protocol stack of an LTE system.
Figure 4:
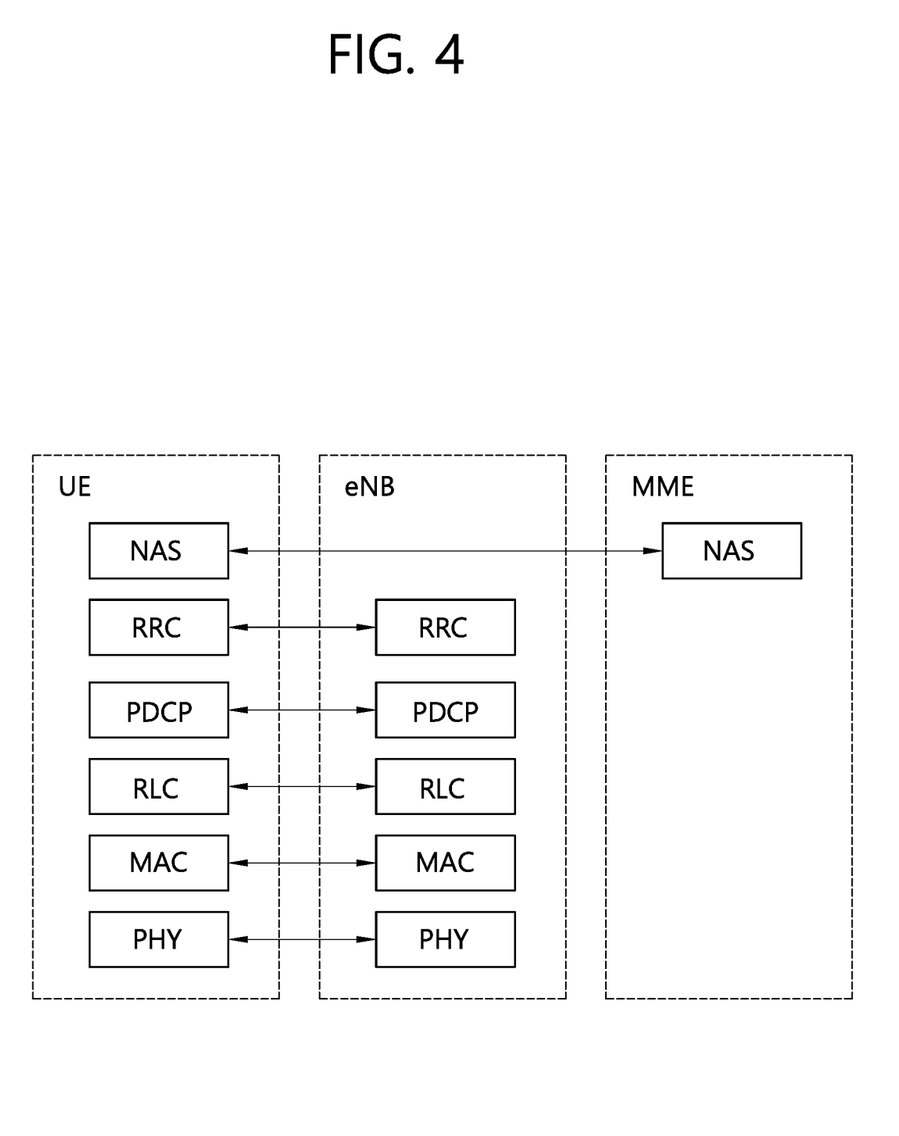
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
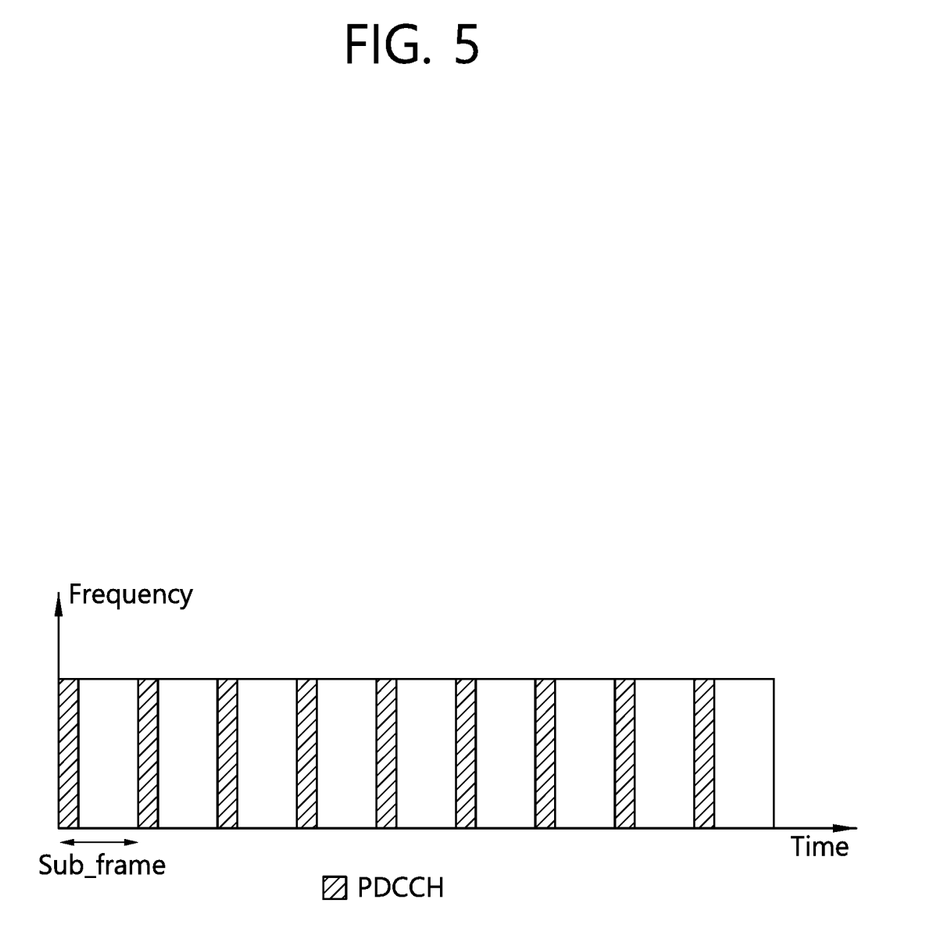
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle.

The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

System information (SI) is described. It may be referred to Section 5.2.1 of 3GPP TS 36.331 V12.6.0 (2015-06). System information is divided into the MasterInformationBlock (MIB) and a number of SystemInformationBlocks (SIBs). The MIB includes a limited number of most essential and most frequently transmitted parameters that are needed to acquire other information from the cell, and is transmitted on BCH. SIBs other than SystemInformationBlockType1 are carried in SystemInformation (SI) messages and mapping of SIBs to SI messages is flexibly configurable by schedulingInfoList included in SystemInformationBlockType1, with restrictions that: each SIB is contained only in a single SI message, and at most once in that message. Only SIBs having the same scheduling requirement (periodicity) can be mapped to the same SI message>SystemInformationBlockType2 is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH.

In addition to broadcasting, E-UTRAN may provide SystemInformationBlockType1, including the same parameter values, via dedicated signaling i.e., within an RRCConnectionReconfiguration message.

The UE applies the system information acquisition and change monitoring procedures for the primary cell (PCell). For a secondary cell (SCell), E-UTRAN provides, via dedicated signaling, all system information relevant for operation in RRC_CONNECTED when adding the SCell. However, a UE that is configured with dual connectivity (DC) shall acquire the MasterInformationBlock of the primary SCell (PSCell) but use it only to determine the system frame number (SFN) timing of the secondary cell group (SCG), which may be different from the master cell group (MCG). Upon change of the relevant system information of a configured SCell, E-UTRAN releases and subsequently adds the concerned SCell, which may be done with a single RRC-ConnectionReconfiguration message. If the UE is receiving or interested to receive an MBMS service in a cell, the UE shall apply the system information acquisition and change monitoring procedure to acquire parameters relevant for MBMS operation and apply the parameters acquired from system information only for MBMS operation for this cell.

System information validity and notification of changes is described. Change of system information (other than for earthquake and tsunami warning system (ETWS), commercial mobile alert system (CMAS) and extended access barring (EAB) parameters) only occurs at specific radio frames, i.e. the concept of a modification period is used. System information may be transmitted a number of times with the same content within a modification period, as defined by its scheduling. The modification period boundaries are defined by SFN values for which SFN mod m=0, where m is the number of radio frames comprising the modification period. The modification period is configured by system information.

Figure 6:
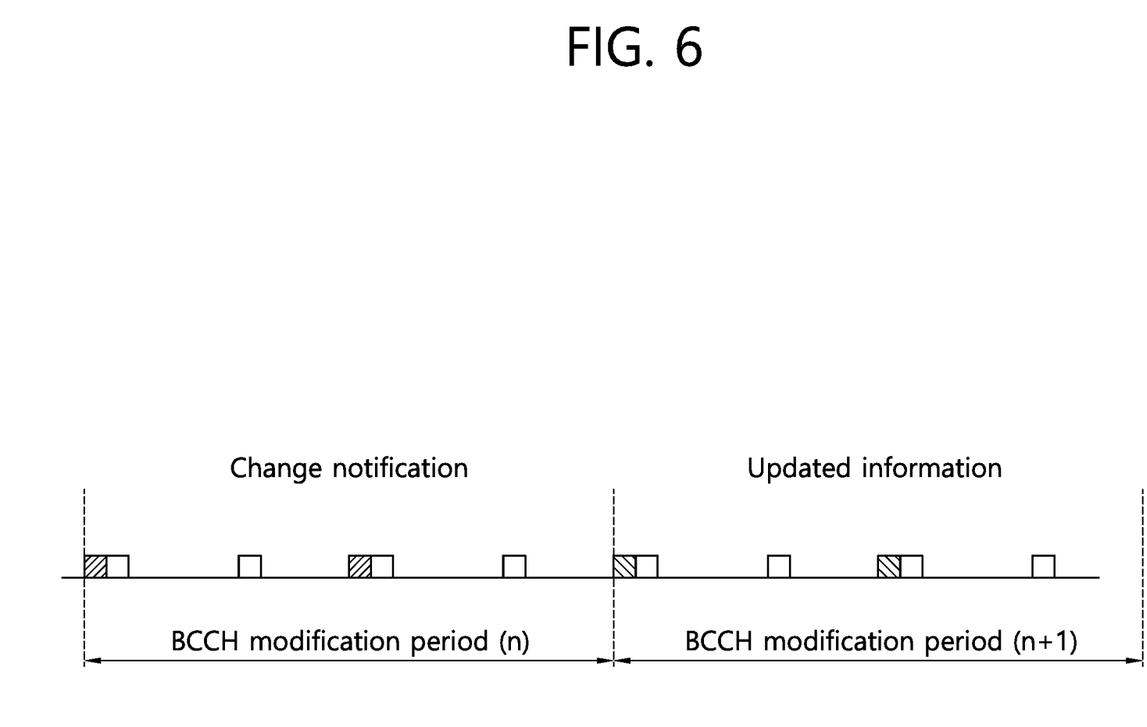
FIG. 6 shows an example of change of system information.

FIG. 6 shows an example of change of system information. When the network changes (some of the) system information, it first notifies the UEs about this change, i.e. this may be done throughout a modification period. In the next modification period, the network transmits the updated system information. Referring to FIG. 6, different pattern indicate different system information. Upon receiving a change notification, the UE acquires the new system information immediately from the start of the next modification period. The UE applies the previously acquired system information until the UE acquires the new system information.

The Paging message is used to inform UEs in RRC_IDLE and UEs in RRC_CONNECTED about a system information change. If the UE receives a Paging message including the systemInfoModification, it knows that the system information will change at the next modification period boundary. Although the UE may be informed about changes in system information, no further details are provided e.g. regarding which system information will change.

SystemInformationBlockType1 includes a value tag, systemInfoValueTag, that indicates if a change has occurred in the SI messages. UEs may use systemInfoValueTag, e.g. upon return from out of coverage, to verify if the previously stored SI messages are still valid. Additionally, the UE considers stored system information to be invalid after 3 hours from the moment it was successfully confirmed as valid, unless specified otherwise.

E-UTRAN may not update systemInfoValueTag upon change of some system information e.g. ETWS information, CMAS information, regularly changing parameters like time information (SystemInformationBlockType8, SystemInformationBlockType16), EAB parameters. Similarly, E-UTRAN may not include the systemInfoModification within the Paging message upon change of some system information.

The UE verifies that stored system information remains valid by either checking systemInfoValueTag in SystemInformationBlockType1 after the modification period boundary, or attempting to find the systemInfoModification indication at least modificationPeriodCoeff times during the modification period in case no paging is received, in every modification period. If no paging message is received by the UE during a modification period, the UE may assume that no change of system information will occur at the next modification period boundary. If UE in RRC_CONNECTED, during a modification period, receives one paging message, it may deduce from the presence/absence of systemInfoModification whether a change of system information other than ETWS information, CMAS information and EAB parameters will occur in the next modification period or not.

ETWS and/or CMAS capable UEs in RRC_CONNECTED shall attempt to read paging at least once every defaultPagingCycle to check whether ETWS and/or CMAS notification is present or not.

Indication of ETWS notification is described. ETWS primary notification and/or ETWS secondary notification can occur at any point in time. ETWS primary notification is contained in SystemInformationBlockType10 and ETWS secondary notification is contained in SystemInformationBlockType11. The Paging message is used to inform ETWS capable UEs in RRC_IDLE and UEs in RRC_CONNECTED about presence of an ETWS primary notification and/or ETWS secondary notification. If the UE receives a Paging message including the etws-Indication, it shall start receiving the ETWS primary notification and/or ETWS secondary notification according to schedulingInfoList contained in SystemInformationBlockType1. If the UE receives Paging message including the etws-Indication while it is acquiring ETWS notification(s), the UE shall continue acquiring ETWS notification(s) based on the previously acquired schedulingInfoList until it re-acquires schedulingInfoList in SystemInformationBlockType1.

The UE is not required to periodically check schedulingInfoList contained in SystemInformationBlockType1, but Paging message including the etws-Indication triggers the UE to re-acquire schedulingInfoList contained in SystemInformationBlockType1 for scheduling changes for SystemInformationBlockType10 and SystemInformationBlockType11. The UE may or may not receive a Paging message including the etws-Indication and/or systemInfoModification when ETWS is no longer scheduled.

Indication of CMAS notification is described. CMAS notification can occur at any point in time. CMAS notification is contained in SystemInformationBlockType12. The Paging message is used to inform CMAS capable UEs in RRC_IDLE and UEs in RRC_CONNECTED about presence of one or more CMAS notifications. If the UE receives a Paging message including the cmas-Indication, it shall start receiving the CMAS notifications according to schedulingInfoList contained in SystemInformationBlockType1. If the UE receives Paging message including the cmas-Indication while it is acquiring CMAS notification(s), the UE shall continue acquiring CMAS notification(s) based on the previously acquired schedulingInfoList until it re-acquires schedulingInfoList in SystemInformationBlockType1.

The UE is not required to periodically check schedulingInfoList contained in SystemInformationBlockType1, but Paging message including the cmas-Indication triggers the UE to re-acquire schedulingInfoList contained in SystemInformationBlockType1 for scheduling changes for SystemInformationBlockType12. The UE may or may not receive a Paging message including the cmas-Indication and/or systemInfoModification when SystemInformationBlockType12 is no longer scheduled.

Notification of EAB parameters change is described. Change of EAB parameters can occur at any point in time. The EAB parameters are contained in SystemInformationBlockType14. The Paging message is used to inform EAB capable UEs in RRC_IDLE about a change of EAB parameters or that SystemInformationBlockType14 is no longer scheduled. If the UE receives a Paging message including the eab-ParamModification, it shall acquire SystemInformationBlockType14 according to schedulingInfoList contained in SystemInformationBlockType1. If the UE receives a Paging message including the eab-ParamModification while it is acquiring SystemInformationBlockType14, the UE shall continue acquiring SystemInformationBlockType14 based on the previously acquired schedulingInfoList until it re-acquires schedulingInfoList in SystemInformationBlockType1.

The EAB capable UE is not expected to periodically check schedulingInfoList contained in SystemInformationBlockType1.

Figure 7:
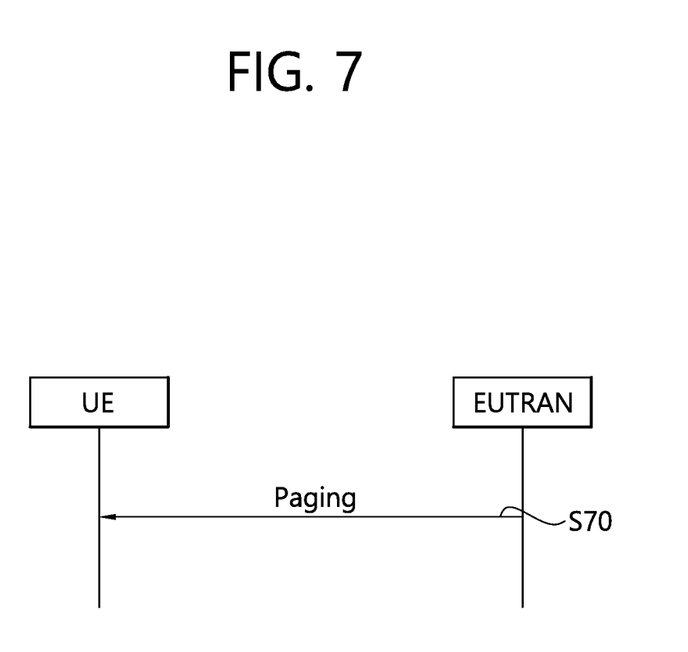
FIG. 7 shows a paging procedure.

FIG. 7 shows a paging procedure. The paging information is provided to upper layers, which in response may initiate RRC connection establishment, e.g. to receive an incoming call. In step S70, E-UTRAN initiates the paging procedure by transmitting the Paging message at the UE's paging occasion. E-UTRAN may address multiple UEs within a Paging message by including one PagingRecord for each UE. E-UTRAN may also indicate a change of system information, and/or provide an ETWS notification or a CMAS notification in the Paging message. Table 1 shows an example of the Paging message.

TABLE 1

```
-- ASN1START
Paging ::= SEQUENCE {
pagingRecordList    PagingRecordList              OPTIONAL, -- Need ON
systemInfoModification      ENUMERATED {true}     OPTIONAL -- Need ON
etws-Indication       ENUMERATED {true}           OPTIONAL, -- Need ON
nonCriticalExtension      Paging-v890-IEs                  OPTIONAL
}
Paging-v890-IEs ::= SEQUENCE {
lateNonCriticalExtension      OCTET STRING                 OPTIONAL,
nonCriticalExtension     Paging-v920-IEs                   OPTIONAL
}
Paging-v920-IEs ::= SEQUENCE {
cmas-Indication-r9       ENUMERATED {true}        OPTIONAL, -- Need ON
nonCriticalExtension      Paging-v1130-IEs                 OPTIONAL
}
Paging-v1130-IEs ::= SEQUENCE {
eab-ParamModification-r11      ENUMERATED {true} OPTIONAL, -- Need ON
nonCriticalExtension      SEQUENCE { }                     OPTIONAL
}
PagingRecordList ::= SEQUENCE (SIZE (1..maxPageRec)) OF PagingRecord
PagingRecord ::= SEQUENCE {
ue-Identity     PagingUE-Identity,
cn-Domain      ENUMERATED         {ps, cs},
...
}
PagingUE-Identity ::= CHOICE {
s-TMSI      S-TMSI,
imsi       IMSI,
...
}
IMSI ::=    (SIZE (6..21)) OF IMSI-Digit
IMSI-Digit ::= INTEGER (0..9)
-- ASN1STOP
```

Referring to Table 1, the Paging message may consist of at least one of the following elements:
  pagingRecordList, which includes ue-Identity field and cn-Domain field: The ue-Identity field provides the NAS identity of the UE that is being paged. The cn-Domain field indicates the origin of paging.
  systemInfoModificaiton: If present, this field indicates a BCCH modification other than SIB10, SIB11, SIB12 and SIB14.

etws-Indication: If present, this field indicates of an ETWS primary notification and/or ETWS secondary notification.

cmas-Indication: If present, this field indicates of a CMAS notification.

eab-ParamModificaton: If present, this field indicates an EAB parameters (SIB14) modification.

Upon receiving the Paging message, the UE shall:

1> if in RRC_IDLE, for each of the PagingRecord, if any, included in the Paging message:

2> if the ue-Identity included in the PagingRecord matches one of the UE identities allocated by upper layers:

3> forward the ue-Identity and the cn-Domain to the upper layers;

1> if the systemInfoModification is included:

2> re-acquire the required system information using the system information acquisition procedure.

1> if the etws-Indication is included and the UE is ETWS capable:

2> re-acquire SystemInformationBlockType1 immediately, i.e., without waiting until the next system information modification period boundary;

2> if the schedulingInfoList indicates that SystemInformationBlockType10 is present:

3> acquire SystemInformationBlockType10;

2> if the schedulingInfoList indicates that SystemInformationBlockType11 is present:

3> acquire SystemInformationBlockType11;

1> if the cmas-Indication is included and the UE is CMAS capable:

2> re-acquire SystemInformationBlockType1 immediately, i.e., without waiting until the next system information modification period boundary;

2> if the schedulingInfoList indicates that SystemInformationBlockType12 is present:

3> acquire SystemInformationBlockType12;

1> if in RRC_IDLE, the eab-ParamModification is included and the UE is EAB capable:

2> consider previously stored SystemInformationBlockType14 as invalid;

2> re-acquire SystemInformationBlockType1 immediately, i.e., without waiting until the next system information modification period boundary;

2> re-acquire SystemInformationBlockType14 using the system information acquisition procedure;

A bandwidth reduced low complexity (BL) UE is described. A BL UE may operate in any LTE system bandwidth but with a limited channel bandwidth of 6 PRBs (corresponding to the maximum channel bandwidth available in a 1.4 MHz LTE system) in DL and UL. A BL UE may access a cell only if the MIB of the cell indicates that access of BL UEs is supported. If not, the UE considers the cell as barred. A BL UE may receive a separate occurrence of system information blocks (sent using different time/frequency resources) (i.e. repetition). A BL UE may a transport block size (TBS) limited to 1000 bit for broadcast and unicast.

A UE in enhanced coverage is described. A UE in enhanced coverage is a UE that requires the use of enhanced coverage functionality to access the cell. A UE may access a cell using enhanced coverage functionality only if the MIB of the cell indicates that access of UEs in enhanced coverage is supported. System information procedures for UEs in enhanced coverage may be identical to the system information procedures for BL UEs. A UE capable of enhanced coverage may acquire, if needed, and use legacy system information when in normal coverage if it is not a BL UE.

A UE capable of enhanced coverage may acquire, if needed, and use system information specific for UEs in enhanced coverage. A UE in enhanced coverage may not be required to detect SIB change when in RRC_CONNECTED.

As described above, the pagingRecoreList in the Paging message includes a list of UE identities, an each UE identity is either SAE-temporary mobile subscriber identity (S-TMSI) or international mobile subscriber identity (IMSI). Considering the size of the UE identity, the paging message is mostly occupied with the pagingRecordList, while the systemInfoModification, etws-Indication, cmas-Indication, and eab-ParamModificaton in the paging message is just 1-bit information.

For SI update, ETWS/CMAS notification and/or EAB modification, UEs in RRC_CONNECTED do not need to receive the pagingRecordList in the Paging message, since the pagingRecordList includes UE identities of paged UEs in RRC_IDLE. However currently, UEs in RRC_CONNECTED need to decode all Paging message, including the pagingRecordList, to know SI update, ETWS/CMAS notification and/or EAB modification.

It may be painful for UEs in RRC_CONNECTED and enhanced coverage. According to the current behavior, the UE in RRC_CONNECTED and enhanced coverage needs to receive repetitions the paging message for SI update, ETWS/CMAS notification and/or EAB modification. This may cause the UE to consume battery power to receive repetitions of the paging message.

In addition, in order to allow devices handheld by normal users (e.g. smart watch) to have benefits of enhanced coverage, ETWS/CMAS notification needs to be quickly delivered toward to those devices even in enhanced coverage where all messages will consume more time to be successfully delivered. However, it is not sure that the current ETWS/CMAS notification mechanism using the Paging message can properly work in enhanced coverage. That is, if enhanced coverage requires more repetitions for every transmission, using the current ETWS/CMAS notification mechanism in enhanced coverage may result in delayed message delivery on radio interface.

In order to solve the problem described above, a method for notifying SI update, ETWS/CMAS notification and/or EAB modification according to an embodiment of the present invention is proposed and described below.

According to an embodiment of the present invention, the UE may determine whether to read the paging message or PDCCH (or MIB) in order to know SI update, ETWS/CMAS notification and/or EAB modification at a cell. Whether to read the paging message or PDCCH may be determined depending on whether the UE is in enhanced coverage of a serving cell or in normal coverage of a serving cell. If the UE is in enhanced coverage, the UE may read PDCCH in order to know SI update, ETWS/CMAS notification and/or EAB modification, and if the UE is in normal coverage, the UE may the paging message in order to know SI update, ETWS/CMAS notification and/or EAB modification. Alternatively, whether to read the paging message or PDCCH may be determined depending on whether the UE operates with the narrower bandwidth than the cell bandwidth (i.e. BL UE) or with full cell bandwidth. If the UE operates with the narrower bandwidth, the UE may read PDCCH in order to know SI update, ETWS/CMAS notification and/or EAB modification, and if the UE operates with the full cell bandwidth, the UE may the paging message in order to know SI update, ETWS/CMAS notification and/or EAB modification. Alternatively, whether to read the paging message or PDCCH may be determined depending on whether the UE is in RRC_CONNECTED or RRC_IDLE. If the UE is in RRC_CONNECTED, the UE may read PDCCH in order to know SI update, ETWS/CMAS notification and/or EAB modification, and if the UE is in RRC_IDLE, the UE may the paging message in order to know SI update, ETWS/CMAS notification and/or EAB modification.

If the UE is in enhanced coverage of a serving cell (e.g. if UE is configured with coverage enhancement operation) or if the UE operates with the narrower bandwidth than the cell bandwidth, the UE may receive SI update, ETWS/CMAS notification, and/or EAB modification via PDCCH, addressed by a paging radio network temporary identity (P-RNTI) or system information RNTI (SI-RNTI), or via MIB. For example, in RRC_IDLE, the network may notify BL UEs or UEs in enhanced coverage about SI update, ETWS/CMAS notification and EAB modification via PDCCH (e.g. using direct indication information). The PDCCH may be a new PDCCH for BL UEs or UEs in enhanced coverage (e.g. MTC PDCCH (MPDCCH)).

The UE may receive the updated SI in the next modification period after reading the PDCCH or MIB. In this case, after reading PDCCH or MIB, the UE may receive the SIB1 for acquiring the scheduling information of other SIB in the next modification period. Alternatively, the UE may immediately receive SIB for ETWS/CMAS (i.e. SIB10 SIB11, SIB12) and/or SIB for EAB (i.e. SIB14) after reading the PDCCH or MIB. The PDCCH or MIB may indicate when/where SIB for ETWS/CMAS or SIB for EAB is scheduled to be transmitted. In this case, after reading PDCCH or MIB, the UE may subsequently receive the SIB1 for acquiring the scheduling information of other SIBs in the same modification period.

Otherwise, i.e. if the UE is in normal coverage or if the UE operates with the full cell bandwidth, the UE may receive SI update, ETWS/CMAS notification, and/or EAB modification via the paging message, which follows the current mechanism.

Figure 8:
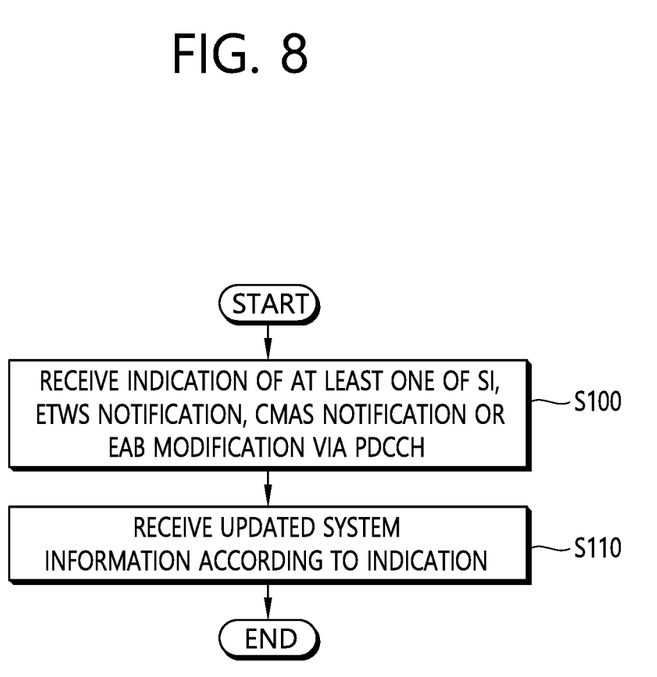
FIG. 8 shows a method for notifying SI update, ETWS/CMAS notification and/or EAB modification according to an embodiment of the present invention.

FIG. 8 shows a method for notifying SI update, ETWS/CMAS notification and/or EAB modification according to an embodiment of the present invention. In this embodiment, it is assumed that the UE is in enhanced coverage of a serving cell (e.g. if UE is configured with coverage enhancement operation), or the UE operates with narrower bandwidth than cell bandwidth (i.e. BL UE).

In step S100, the UE receives an indication of at least one of SI update, ETWS notification, CMAS notification or EAB modification via PDCCH or MIB. The UE may periodically receive either PDCCH, addressed by P-RNTI or SI-RNTI, or MIB. While in RRC_IDLE, the UE may monitor the PDCCH according to paging occasions. While in RRC_CONNECTED, the UE may monitor the PDCCH according to the BCCH modification period dedicated to UEs in enhanced coverage of a serving cell and/or for UEs operating with narrower bandwidth than cell bandwidth.

In step S110, the UE receives system information according to the received indication. If the indication received via PDCCH includes an indication of SI update of one or more specific SIB, the UE may receive the corresponding SIB based on the indication received via PDCCH. The corresponding SIB may be received in the next modification period while skipping SI scheduling information included in the SIB1. The corresponding SIB may be used/dedicated to UEs in enhanced coverage of a serving cell and/or for UEs operating with narrower bandwidth than cell bandwidth. The indication of SI update of one or more specific SIB may indicate whether the corresponding SIB is updated. The indication of SI update of one or more specific SIB may indicate when the corresponding SIB is to be transmitted. The indication of SI update of one or more specific SIB may assign DL resources and modulation and coding scheme (MCS) used for transmission of the corresponding SIB. The indication of SI update of one or more specific SIB may indicate the TBS of the corresponding SIB.

If the indication received via PDCCH includes an indication of ETWS/CMAS notification, the UE may immediately receive the SIB carrying ETWS/CMAS message (i.e. SIB10/SIB11/SIB12) based on the indication received via PDCCH, rather than receiving SIB1 to check SI scheduling information. The SIB carrying ETWS/CMAS message may be used/dedicated to UEs in enhanced coverage of a serving cell and/or for UEs operating with narrower bandwidth than cell bandwidth. The indication of ETWS/CMAS notification may indicate whether the SIB carrying ETWS/CMAS message is updated. The indication of ETWS/CMAS notification may indicate when the SIB carrying ETWS/CMAS message is to be transmitted. The indication of ETWS/CMAS notification may assign DL resources and MCS used for transmission of the SIB carrying ETWS/CMAS message. The indication of ETWS/CMAS notification may indicate the TBS of the SIB carrying ETWS/CMAS message.

If the indication received via PDCCH includes an indication of EAB modification, the UE may immediately receive the SIB carrying EAB information (i.e. SIB14) based on the indication received via PDCCH, rather than receiving SIB1 to check SI scheduling information. The SIB carrying EAB information may be used/dedicated to UEs in enhanced coverage of a serving cell and/or for UEs operating with narrower bandwidth than cell bandwidth. The indication of EAB modification may indicate whether the SIB carrying EAB information is updated. The indication of EAB modification may indicate when the SIB carrying EAB information is to be transmitted. The indication of EAB modification may assign DL resources and MCS used for transmission of the SIB carrying EAB information. The indication of EAB modification may indicate the TBS of the SIB carrying EAB information.

Figure 9:
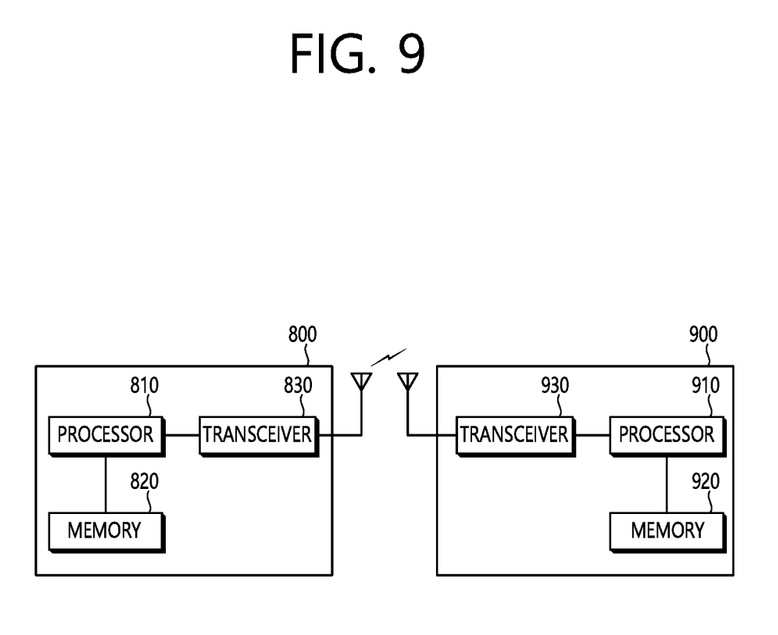
FIG. 9 shows a wireless communication system to implement an embodiment of the present invention.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. That is, the processor 910 may control the transceiver 930 to transmit a CB-SR to the eNB 800 by using CB-SR resources to request SL transmission resources, and determine whether a SL grant for the SL transmission resources is received or not. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
    receiving, from a network, direct information on a physical downlink control channel (PDCCH) addressed by a paging radio network temporary identity (P-RNTI),
    wherein the direct information informs at least one of system information (SI) update, earthquake and tsunami warning system (ETWS) notification, commercial mobile alert system (CMAS) notification, or extended access barring (EAB) modification; and
    receiving system information which is related to the direct information from the network,
    wherein the wireless device is in enhanced coverage or the wireless device operates with narrower bandwidth than a cell bandwidth, and
    wherein the direct information is received without associated paging message.

2. The method of claim 1, wherein the direct information is received in a current modification period, and
    wherein the system information is received in a next modification period.

3. The method of claim 2, wherein the system information corresponds to one of system information blocks (SIBs) other than SIB10, SIB11, SIB12 or SIB14.

4. The method of claim 1, wherein the direct information is received in a current modification period, and
    wherein the system information is received in the current modification period.

5. The method of claim 4, wherein the system information corresponds to a system information block (SIB) carrying an ETWS message, a CMAS message or EAB information.

6. The method of claim 5, wherein the system information corresponds to one of SIB10, SIB11, SIB12 or SIB14.

7. The method of claim 4, wherein the direct information informs when or where the system information is scheduled.

8. The method of claim 1, wherein the direct information informs whether the system information is updated or not.

9. The method of claim 1, wherein the direct information informs downlink (DL) resources and a modulation and coding scheme (MCS) used for transmission of the system information.

10. The method of claim 1, wherein the direct information informs a transport block size (TBS) of the system information.

11. The method of claim 1, wherein receiving the system information further comprises receiving a SIB1 which includes scheduling information of the system information from the network.

12. A wireless device in a wireless communication system, the wireless device comprising:
    a memory;
    a transceiver; and
    at least one processor, operatively coupled to the memory and the transceiver, configured to:
        control the transceiver to receive, from a network, direct information on a physical downlink control channel (PDCCH) addressed by a paging radio network temporary identity (P-RNTI),
        wherein the direct information informs at least one of system information (SI) update, earthquake and tsunami warning system (ETWS) notification, commercial mobile alert system (CMAS) notification, or extended access barring (EAB) modification, and
        control the transceiver to receive system information which is related to the direct information from the network,
        wherein the wireless device is in enhanced coverage or the wireless device operates with narrower bandwidth than a cell bandwidth, and
        wherein the direct information is received without associated paging message.

* * * * *